United States Patent [19]
Rothen et al.

[11] Patent Number: 5,338,106
[45] Date of Patent: Aug. 16, 1994

[54] PROCESS FOR BRAKING A VEHICLE

[75] Inventors: Johann Rothen, Sarstedt; Bernd Zobirei, Ronnenberg; Manfred Schult, Garbsen, all of Fed. Rep. of Germany

[73] Assignee: WABCO Standard GmbH, Hanover, Fed. Rep. of Germany

[21] Appl. No.: 991,984

[22] Filed: Dec. 17, 1992

[30] Foreign Application Priority Data

Dec. 21, 1991 [DE] Fed. Rep. of Germany ........ 4142670

[51] Int. Cl.$^5$ ................................................. B60T 8/18
[52] U.S. Cl. ................................. 303/9.69; 303/100; 303/105
[58] Field of Search ................. 303/9.62, 9.69, 7, 22.6, 303/99, 105, 100, DIG. 1–4; 364/426.02

[56] References Cited

U.S. PATENT DOCUMENTS

| | | | |
|---|---|---|---|
| 3,768,876 | 10/1973 | Lewis | 303/9.69 |
| 3,893,695 | 7/1975 | Rickert | 303/20 |
| 4,058,346 | 11/1977 | Burckhardt | 303/9.69 |
| 4,720,150 | 1/1988 | Heubner | 303/9.69 |
| 4,824,185 | 4/1989 | Leiber et al. | 303/113.5 |
| 4,964,676 | 10/1990 | Resch | 303/92 X |

FOREIGN PATENT DOCUMENTS

| | | |
|---|---|---|
| 0189077 | 7/1986 | European Pat. Off. . |
| 0288846 | 11/1988 | European Pat. Off. . |
| 0445575A | 9/1991 | European Pat. Off. . |
| 3318020 | 11/1984 | Fed. Rep. of Germany . |
| 3502051 | 7/1985 | Fed. Rep. of Germany . |
| 3706663 | 9/1988 | Fed. Rep. of Germany . |
| 3901923 | 9/1990 | Fed. Rep. of Germany . |
| 3923955 | 1/1991 | Fed. Rep. of Germany . |
| 4007360 | 9/1991 | Fed. Rep. of Germany . |
| 967033 | 8/1964 | United Kingdom ............... 303/9.69 |

*Primary Examiner*—Robert J. Oberleitner
*Assistant Examiner*—Lee W. Young
*Attorney, Agent, or Firm*—Meltzer, Lippe, Goldstein, Wolf, Schlissel & Sazer

[57] ABSTRACT

A process for braking a vehicle which comprises applying to a front axle group and to a rear axle group front axle brake pressure ($p_1$) and rear axle brake pressure ($p_2$) in accordance with wear-optimized curves when a deceleration command signal (S) is less than or equal to a predetermined switch-over deceleration command signal ($S_1$). When the deceleration command signal (S) is greater than the switch-over deceleration command signal ($S_1$), the front axle brake pressure ($p_1$) and the rear axle brake pressure ($p_2$) are applied in accordance with parabolas which pass smoothly through a point on the wear-optimized curves which corresponds to the switch-over deceleration command signal ($S_1$), and at least one point on curves for equal adhesion utilization of the front axle group and the rear axle group, which point corresponds to a second deceleration command signal ($S_2$).

16 Claims, 7 Drawing Sheets

PROCESS FOR BRAKING A VEHICLE

BACKGROUND OF THE INVENTION

The invention relates to a process for braking a vehicle as well as to braking systems for carrying out the process. Hereinafter, the terms "front axle brake" and "rear axle brake" will be used to refer collectively to all the components participating in producing the braking force in the area of the appertaining axle group.

In designing a braking system and the brake pressure distribution between the axle groups, the criteria for "equal adhesion utilization ($\mu$) between all the wheels and the road surface" and "equally great brake lining wear on all brakes" play important roles. The advantage of "equal adhesion utilization ($\mu$)" consists of optimal braking with good directional stability of the vehicle during braking. A braking system offering such a utilization of adhesion can be said to be "stability-optimized" in braking. A braking system with "equally great brake lining wear on all brakes" can be said to be "wear-optimized." As a result of wear optimization, all of the vehicle's brake linings can be replaced at the same time and this criterion thus offers economic advantages.

If the arrangement of the brake components is established, the brake pressure distribution among the axles determines for a given vehicle mass whether the braking system is operated in a stability-optimized mode, a wear optimized mode, or some other mode.

Figure 1:
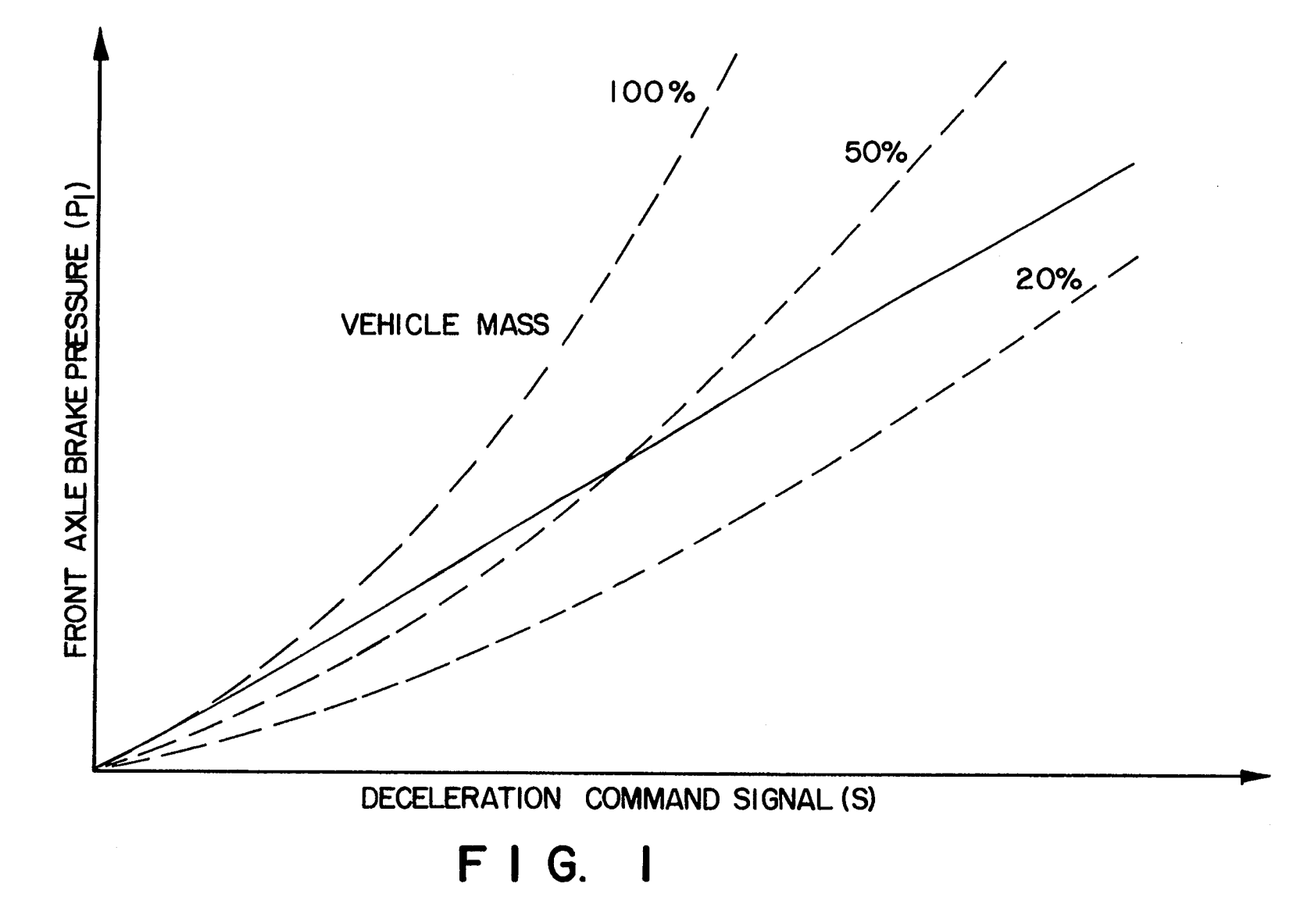
FIG. 1 shows schematic ideal curves of the front axle brake pressure as a function of the deceleration command signal ($p_1 = f(S)$)
Figure 2:
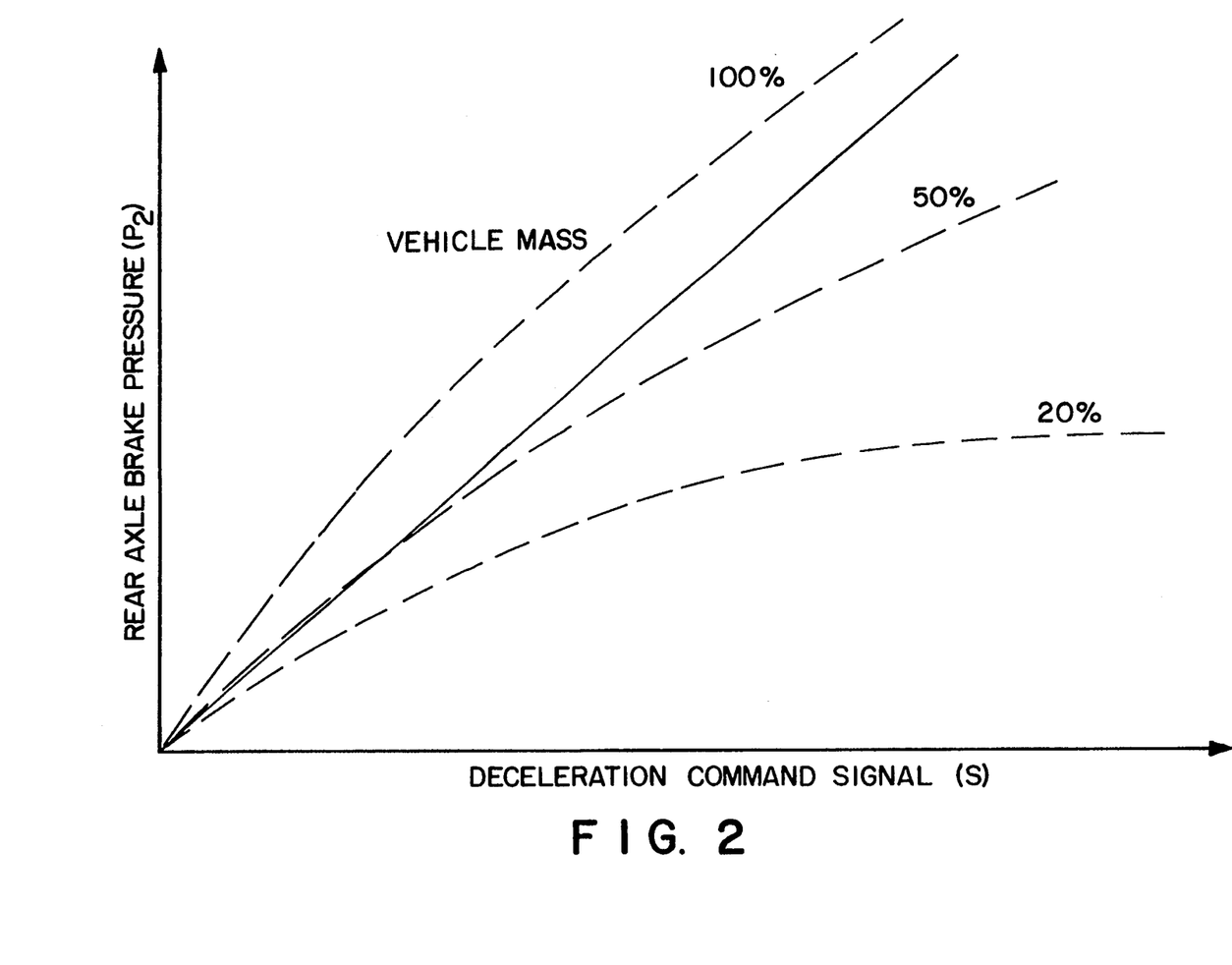
FIG. 2 shows corresponding ideal curves of the rear axle brake pressure as a function of the deceleration command signal ($p_2 = f(S)$)

FIGS. 1 and 2 show schematic ideal curves for the front axle brake pressure $p_1$ and for the rear axle brake pressure $p_2$ as functions of vehicle deceleration command signals for stability-optimized operation of the braking system with different vehicle masses and for wear-optimized operation that is always independent of load. These curves can be calculated in a known manner by using characteristic data of the brake components as well as the load data and certain dimensions of the vehicle.

The curve for wear-optimized operation shown here is based according to the invention on the condition of equal specific brake lining load, i.e., equal surface pressure or energy per surface unit on all brakes. The curves for wear-optimized operation are straight lines, while the ideal curves for stability-optimized operation are parabolas shown in dashed line. The different characteristics of the curves in FIGS. 1 and 2 show that it is impossible to design a braking system so as to be simultaneously wear-optimized and stability-optimized.

It is known that in practical vehicle operation, most of the braking is done within a partial braking range for small vehicle deceleration (i.e., up to approx. 0.3 g), and with correspondingly low brake pressures. As a result, the brake lining wear occurs mainly owing to low brake pressures.

A process for distributing the braking pressure between a front axle brake group and a rear axle brake group is known from DE 35 02 051 A1, in particular from page 10, last paragraph therein. In the process described therein, it was suggested to provide for brake pressure distribution within the partial range, i.e., in the presence of lower deceleration command signals, in a wear-optimized manner and to change over to a stability-optimized mode in the presence of greater deceleration command signals. However, as a consequence of the jump that is involved between the curves, a sudden change in brake pressure and thereby a sudden change in vehicle deceleration (i.e., a jolt) cannot be avoided.

It is the object of the instant invention to further develop a process for distributing the braking pressure between the front axle brake group and the rear axle brake group by simple means and in such a manner as to ensure a non-sudden evolution of brake pressure and a non-sudden (i.e., jolt-free) evolution of vehicle deceleration.

SUMMARY OF THE INVENTION

This object is achieved by the present invention which provides a process for braking a vehicle comprising applying to a front axle group and to a rear axle group front axle brake pressure ($p_1$) and rear axle brake pressure ($p_2$) in accordance with wear-optimized curves when a deceleration command signal (S) is less than or equal to a predetermined switch-over deceleration command signal ($S_1$). When the deceleration command signal (S) is greater than the switch-over deceleration command signal ($S_1$), the front axle brake pressure ($p_1$) and the rear axle brake pressure ($p_2$) are applied in accordance with parabolas which pass smoothly through a point on the wear-optimized curves which corresponds to the switch-over deceleration command signal ($S_1$), and at least one point on curves for equal adhesion utilization of the front axle group and the rear axle group, which point corresponds to a second deceleration command signal ($S_2$).

BRIEF DESCRIPTION OF THE DRAWINGS

The invention is explained below through drawings in which.

DETAILED DESCRIPTION OF THE INVENTION

Figure 3:
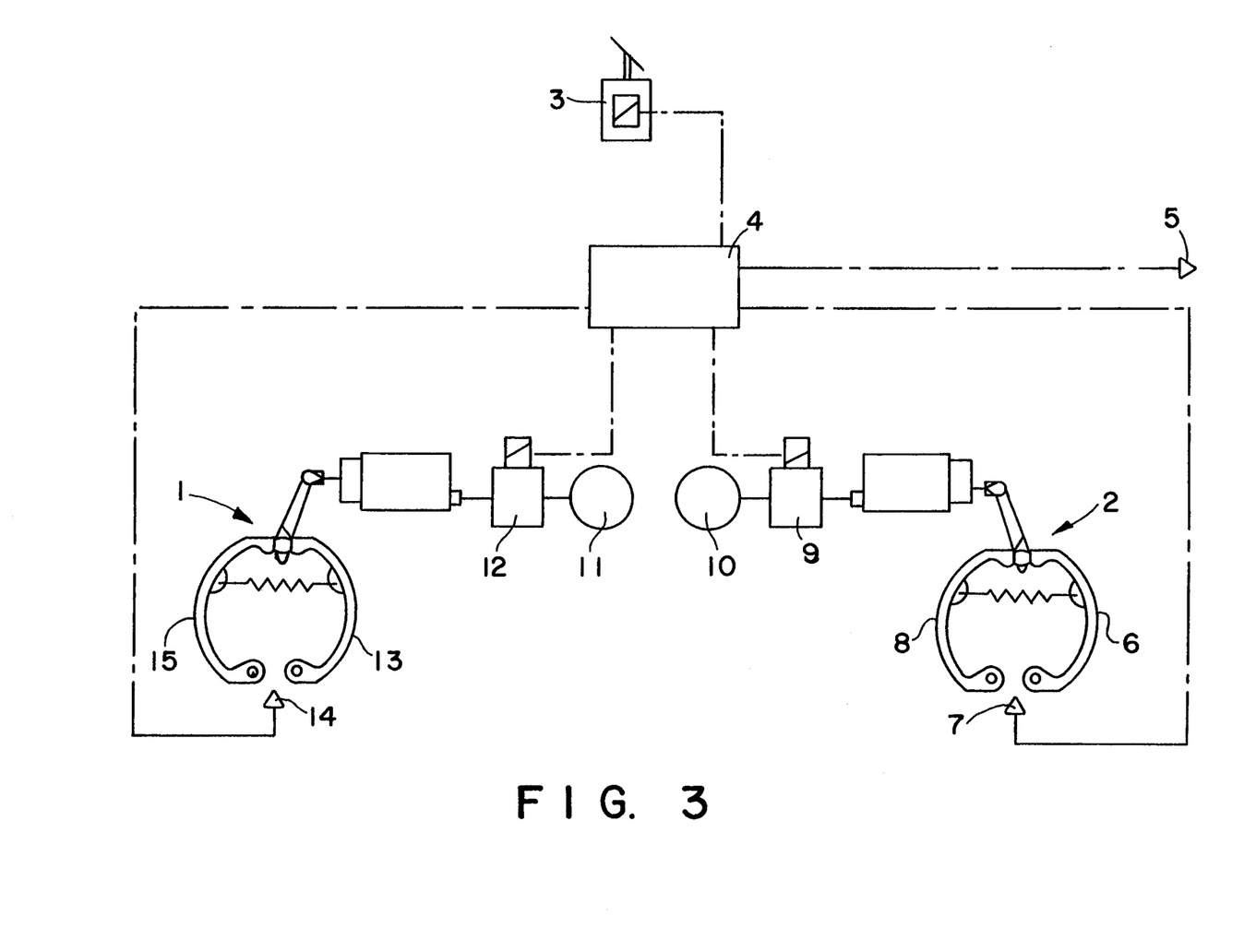
FIG. 3 shows schematically the braking system of a vehicle.

The braking system shown in FIG. 3 comprises a front axle brake (1) and a rear axle brake (2) which are actuated through pressure and are located on a front axle group or a rear axle group of the vehicle. Gaseous pressure means (e.g., compressed air) or hydraulic pressure means can be used as the pressurizing means. "Front axle group" or "rear axle group" can be individual axles or multi-axle aggregates. The front axle brake (1) and the rear axle brake (2) which are simply called "brake(s)" hereinafter for the sake of simplification, can be the single brake of an axle group but as a rule these terms refer to several brakes of the axle groups assigned to the vehicle sides. The terms "front axle brake," "rear axle brake," and "brake" are collective terms referring to all the components participating in the production of the braking force for the appertaining axle. Among these components are, e.g., brake cylinders, transmission devices, brake shoes or brake pads, brake drums or brake disks, brake linings, etc. Of these components, only the brake linings (13, 15) of the front axle brake (1) and the brake linings (6, 8) of the rear axle bake (2) are identified specifically.

Figure 4:
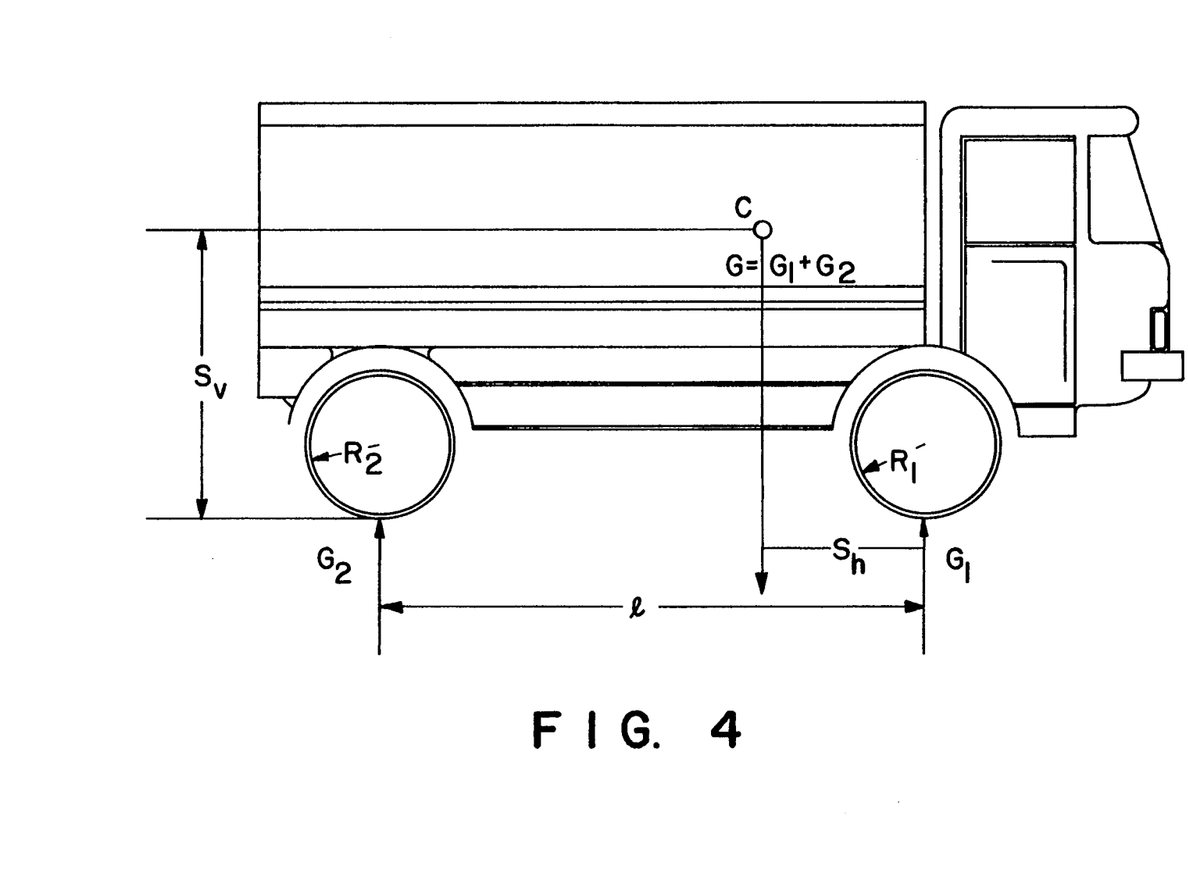
FIG. 4 shows schematically a side view of the vehicle with certain essential parameters.

Consider first the vehicle shown in FIG. 4. The front axle group load ($G_1$) and the rear axle group load ($G_2$) act upon their respective axle groups. These loads are called "static" for a standing vehicle and for a vehicle travelling at constant speed. With accelerating or decelerating travel, dynamic axle group load transfers occur, causing static axle group loads to become "dynamic" ones. At the center of gravity (C) of the vehicle, the vehicle mass ($G=G_1+G_2$) takes effect. The horizontal coordinate of the center of gravity (C), which is indicated in FIG. 4 as the distance ($s_h$) from the (geometric) center of the front axle group, can be determined from the static axle loads ($G_1$, $G_2$) and from the distance l between axles. The vertical coordinate of the center of gravity, shown in FIG. 4 as height ($s_v$) above the roadway, can be determined for a given vehicle deceleration or acceleration (a) from the vehicle mass (G) and the dynamic axle group load transfer. Finally, the wheel radii ($R_1$ and $R_2$) are also shown in FIG. 4.

Returning now to FIG. 3, in order to actuate and control the brakes (1, 2), the braking system contains a deceleration command signal transmitter (3), an electric pressure modulator (12) and a pressure storage (11) for the front axle brake (1), an electric pressure modulator (9) and a pressure storage (10) for the rear axle brake (2), as well as control electronics (4, 5, 7, 14). The control electronics (4, 5, 7, 14) comprise a central unit (4), load sensors (14, 7) for the front axle group load ($G_1$) and the rear axle group load ($G_2$) respectively, as well as a deceleration sensor (5) for the actual vehicle deceleration.

Characteristic data for the brake components as well as for the wheel base (l) of the vehicle and the wheel diameters ($R_1$ and $R_2$) are stored in the central unit (4) as fixed values.

When the driver of the vehicle actuates the deceleration command signal transmitter (3), an electric deceleration command signal (5) corresponding to the value of the actuating force and/or of the actuating distance is transmitted. The central unit (4) receives the deceleration command signal (5), the load signals from load sensors (14, 7), as well as the actual-deceleration signal from the deceleration sensor (5) as variable values.

The central unit (4) is designed and programmed so that it first calculates ideal curves for the front axle brake pressure $p_1$ and for the rear axle pressure $p_2$ from the stored fixed values and the received variable values as functions of the deceleration command signal (S) for stability-optimized operation, and then target curves for the brake pressures ($p_1$ and $p_2$).

Figure 5:
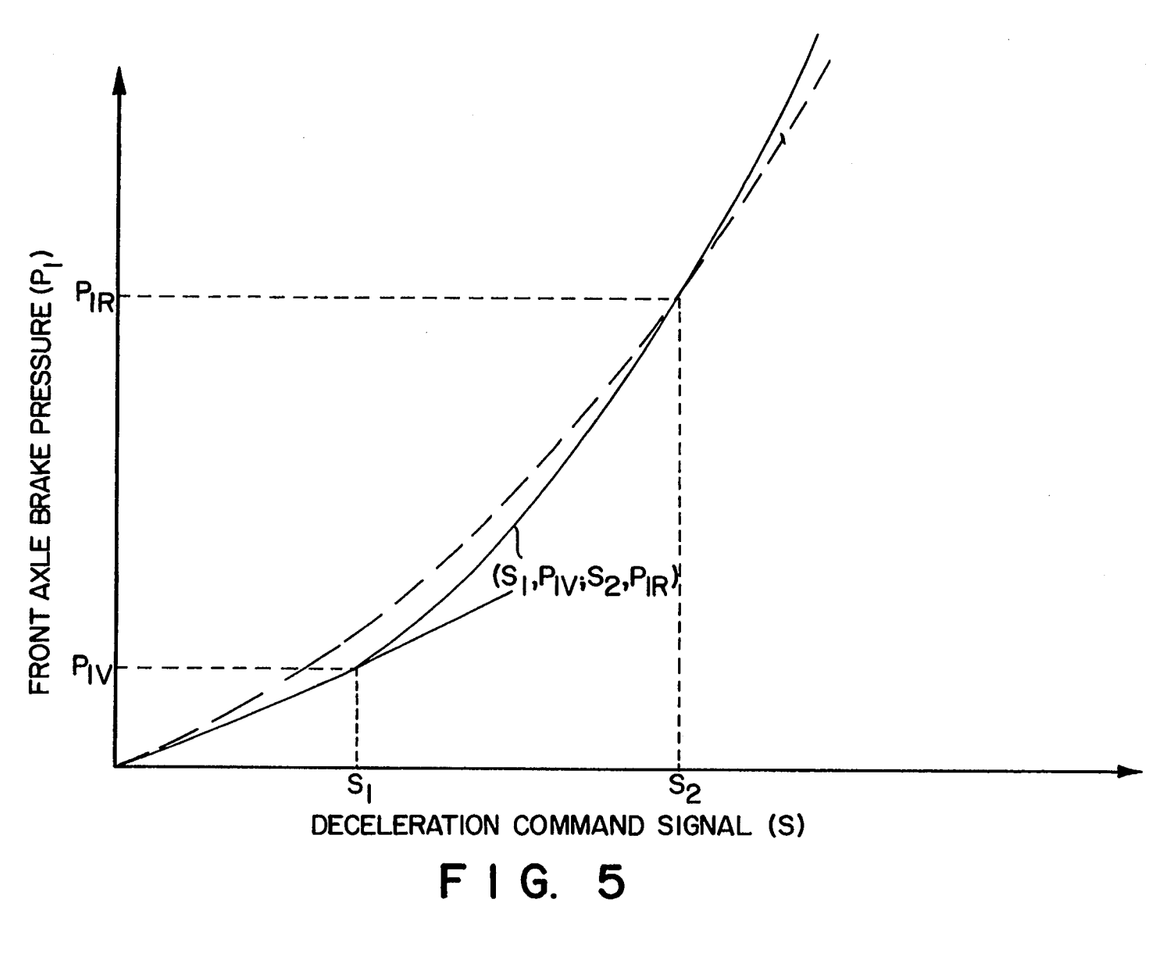
FIG. 5 shows a target curve $p_1 = f(S)$ for front axle braking pressure.
Figure 6:
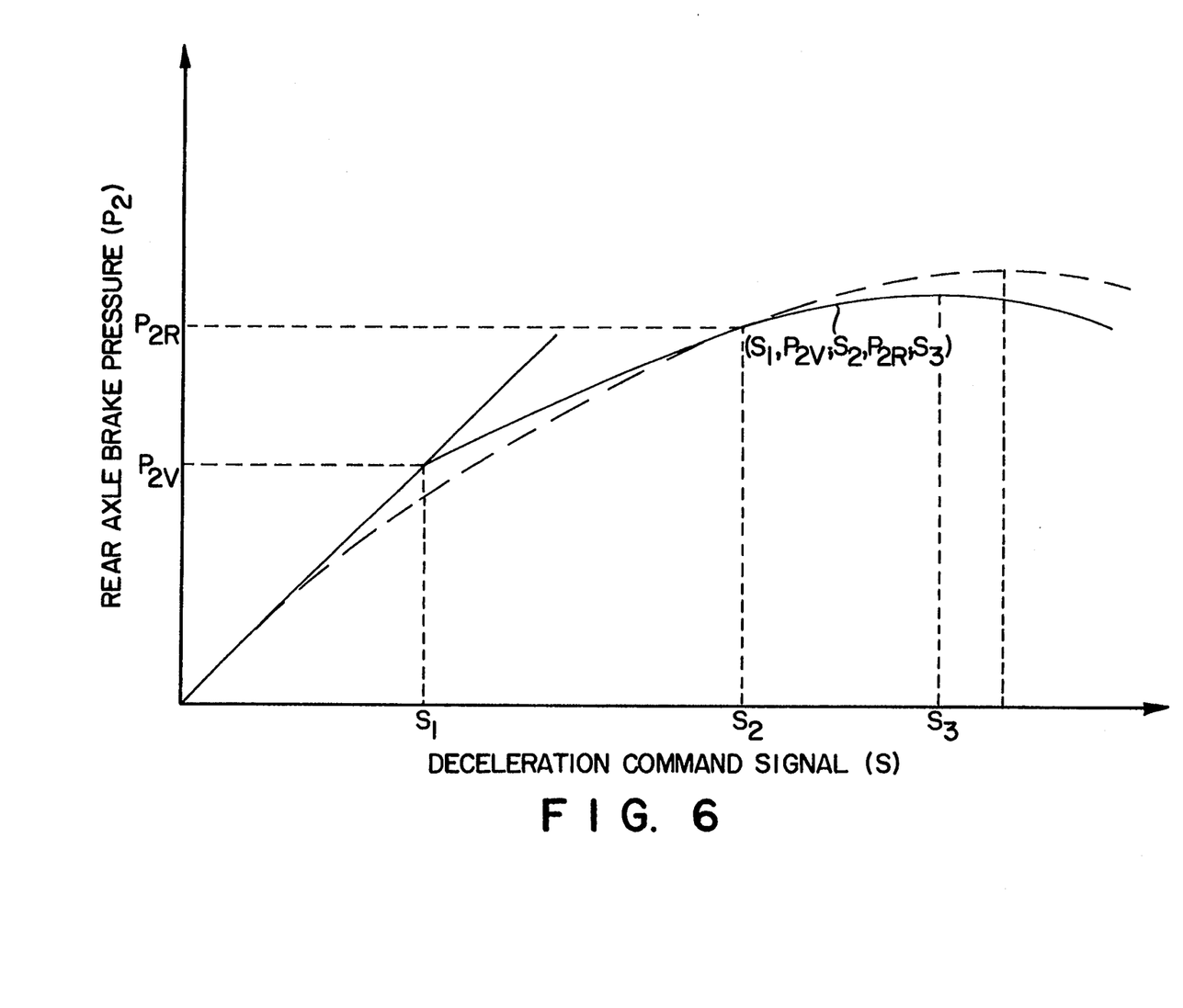
FIG. 6 shows the appertaining target curve $p_2 = f(S)$ for rear axle braking pressure.

For a first embodiment of the central unit (4), these curves are shown as examples in FIGS. 5 and 6 for a fully loaded vehicle, i.e., for 100% vehicle mass. The ideal curves for stability-optimized operation are shown in dashed line, while the target curves are shown as solid lines.

Each target curve consists of two curve branches. The first target curve branch applies to values of the deceleration command signal (S) between zero and a predetermined switch-over deceleration command signal ($S_1$) which may correspond to a vehicle deceleration of 0.3 g, for example. This curve branch tracks the appertaining (straight) curve for wear-optimized operation which is independent of load. The central unit (4) calculates the brake pressures ($p_1$ and $p_2$) for (smaller) deceleration command signals up to the value of the switch-over deceleration command signal ($S<S_1$), i.e., it calculates them for wear-optimized operation. As appears from FIG. 5, a front axle brake pressure $P_{1V}$ is assigned to the end point ($S_1$, $P_{1V}$) of the first target curve branch of the front axle brake pressure $p_1$.

The second target curve branch applies to higher values of the vehicle deceleration command signal ($S>S_1$). The second target curve branch is formed by a parabola ($S_1$, $p_{1V}$; $S_2$, $p_{1R}$), hereinafter called an approximate parabola, to which the following conditions apply: The approximate parabola passes through the end point ($S_1$, $p_{1V}$) of the first target curve branch. The slope of the approximate parabola at this point is equal to the slope of the ideal curve for stability-optimized operation at its point assigned to the switch-over deceleration command signal ($S_1$). Therefore the ideal curve and the approximate parabola should be oriented in the same direction or should be parallel for the value ($S_1$). Furthermore the approximate parabola passes through a point ($S_2$, $p_{1R}$) defined by a predetermined second deceleration command signal ($S_2$) and by the front axle brake pressure ($p_{1R}$) assigned to same on the ideal curve. The value of the second deceleration command signal ($S_2$) is set between 70% and 100% of the practically usable value range of the deceleration command signal (S). The value ($S_2$) can be adapted to special vehicle conditions and/or special operating conditions of the vehicle or of the vehicle type concerned.

As appears from FIG. 6, a rear axle brake pressure ($p_{2v}$) is assigned to the end point of the first target curve branch of the rear axle brake pressure ($p_2$). The second target curve branch of the rear axle brake pressure $p_2$ also applies to higher values of the deceleration command signal ($S>S_1$). The second target curve branch is formed by a second parabola ($S_1$, $p_{2v}$; $S_2$, $p_{2R}$; $S_3$) which is also called an approximate parabola and to which the following conditions apply: The approximate parabola passes through the end point ($S_1$, $p_{2V}$) of the first target curve branch. Furthermore, the approximate parabola passes through a point ($S_2$, $p_{2R}$) on the ideal curve which is defined by the second deceleration command signal ($S_2$) and by its assigned rear axle brake pressure ($p_{2R}$) of the ideal curve of the rear axle brake pressure for stability-optimized operation. Furthermore, the approximate parabola has an apex for a predetermined value ($S_3$) of the deceleration command signal (S).

The value ($S_3$) can be adapted to special vehicle conditions and/or special operating conditions of the vehicle or of the vehicle type concerned. It will often be the value at which the ideal curve will have its apex for a predetermined vehicle mass.

In a second embodiment, the central unit (4) calculates the target curves of the front axle brake pressure ($p_1$) as described above, but determines the target curve of the rear axle brake pressure ($p_2$) differently.

Figure 7:
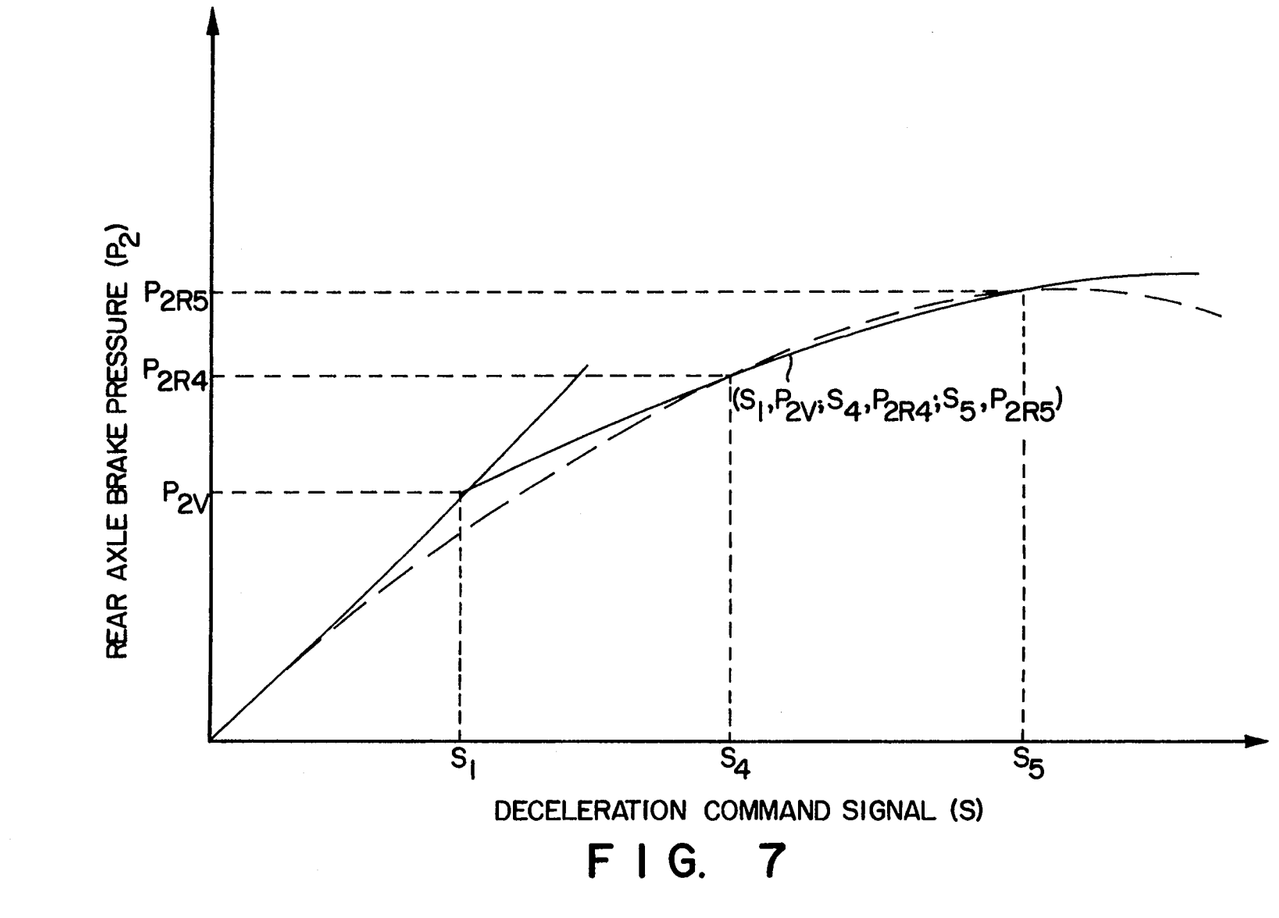
FIG. 7 shows another target curve $p_2 = f(S)$ for rear axle braking pressure.

Again as an example for a 100% vehicle mass, FIG. 7 shows the curve of the rear axle brake pressure ($p_2$) for the second embodiment of the central unit (4). What was said in connection with FIGS. 5 and 6 also applies to the first target curve branch up to its end point ($S_1$, $p_{2V}$). The approximate parabola constituting the second curve branch again passes through this end point. For the continued course of the approximate parabola, the following conditions apply: The approximate parabola passes through a second point ($S_4$, $p_{2R4}$) which is defined by a predetermined third deceleration command signal ($S_4$) and a rear axle brake pressure ($p_{2R4}$) assigned to it. With increasing values for the deceleration command signal (S), the approximate parabola passes through a third point ($S_5$, $p_{2R5}$) which is defined by a predetermined fourth deceleration command signal ($S_5$) and a rear axle brake pressure ($p_{2R5}$) assigned to it. In this case the third vehicle deceleration signal ($S_4$) and the fourth deceleration signal ($S_5$) are within a value range that corresponds to a vehicle deceleration between 0.4 g and 1.0 g. Furthermore, the second point ($S_4$, $p_{2R4}$) and the third point ($S_5$, $p_{2R5}$) should be located on the ideal curve which is again drawn in a broken line.

The values ($S_4$) and ($S_5$) can be adapted to special vehicle conditions and/or special operating conditions of the vehicle or vehicle type concerned. In many cases, it has been shown to be advantageous to set the value ($S_4$) according to a vehicle deceleration between 0.45 g and 0.6 g and the value ($S_5$) according to a vehicle deceleration between 0.6 g and 1.0 g.

The central unit (4) is furthermore designed and programmed so that it converts the calculated target curves into electric control signals for the pressure modulators (12 and 9) in the direction of pressure increase and transmits them to the pressure modulators (12 and 9). Upon receiving its assigned control signal, each pressure modulator (12 or 9) establishes a connection between the appertaining pressure storage (11 or 10) and the brake cylinder of the appertaining brake (1 or 2) until the brake pressure ($p_1$ or $p_2$) has increased according to the applicable target curve which has been calculated by the central unit (4) for the given deceleration command signal (S).

The pressure modulators (12 and 9) can be made in the form of directional control valves (Open/Close valves). In that case the central unit (4) produces control signals with constant value which it switches over to pressure maintenance upon receiving a return message indicating that the brake pressure in question ($p_1$ or $p_2$) has reached the value according to the target curve. Brake pressure sensors are required in that case to ensure the transmission of the return message. These are not shown because they are often integrated into the pressure modulators (12 and 9).

The pressure modulators (12 and 9) can also be of a design which sets the applicable brake pressure ($p_1$ or $p_2$) according to the value of the transmitted control signal. This construction is normally called a "proportional valve" even though the dependency of the applicable brake pressure ($p_1$ or $p_2$) upon the value of the control signal need not necessarily be linear. In that case, the central unit (4) produces variable control signals which are in a manner of speaking electric images of the brake pressures ($p_1$ or $p_2$) according to the corresponding target curve.

The basic design of the embodiment as described so far can be simplified. It is known that in vehicles being used, generally reproducible interrelationships exist between the vehicle mass, the axle group load distribution and the position of the center of gravity. This means that when these interrelationships are known, the measurement of only one axle group load is sufficient for a precise or sufficiently precise description of the appertaining vehicle mass and of the position of the center of gravity. The contemplated simplification is based on the knowledge of this fact. For the purpose of this simplification the above-mentioned interrelationships are stored in the central unit (4) and are used to calculate the curves of the front axle brake pressure ($p_1$) and of the rear axle brake pressure ($p_2$). The control electronics then need only one load sensor (7 or 14) and no longer need any deceleration sensor. In that case, the central unit (4) replaces the ideal curves for stability-optimized operation with approximately ideal curves and uses them in calculating the target curve in the same manner as the ideal curves. This simplification is practically insignificant in vehicle operation since it hardly matters whether the ideal or the approximately ideal curve for stability-optimized operation is used as the basis for the approximate parabolas ($S_1$, $p_{1V}$; $S_2$, $p_{1R}$), ($S_1$, $p_{2V}$; $S_2$, $p_{2R}$; $S_3$) or ($S_1$, $p_{2V}$; $S_4$, $p_{2R4}$; $S_5$, $p_{2R5}$) constituting the second target curve branch.

Through the above-described adjustment of the front axle brake pressure ($p_1$) and of the rear axle pressure ($p_2$) according to the target curves, the embodiment makes it possible to achieve wear-optimized operation with lower deceleration command signals S (up to the value of the switch-over deceleration command signal $S_1$), and a well approximated stability-optimized operation of the braking system with higher deceleration command signals S, while ensuring a brake pressure evolution without jumps and a jolt-free evolution of the vehicle deceleration.

In a further development of the invention, the surfaces of the brake linings (13, 15 and 6, 8) can be sized so that the surface of the front axle brake lining (13, 15) is in relation to the surface of the rear axle brake lining (6, 8) as the static front axle group load ($G_1$) is to the static rear axle group load ($G_2$) with a predetermined vehicle mass between 70% and 100% of the admissible vehicle mass. This sizing results in giving the curve for wear-optimized operation and the ideal or approximately ideal curve for stability-optimized operation assigned to the vehicle mass on which it is based the same slope at the starting point of the curves. Thanks to the equality of the slope, both curves evolve close together within the range of smaller deceleration command signals (S) so that the braking system is operated in this range as much as possible in a wear-optimized and at the same time ideal or approximately ideal stability-optimized manner. The range of smaller deceleration command signals (S) can be understood in a different way in this connection than as mentioned earlier. The predetermined vehicle mass constituting the basis for the sizing of the surfaces of the brake linings should be the kind of vehicle mass which often occurs in vehicle operation and which therefore plays a determining role in influencing the brake lining wear. Such vehicle masses are as a rule within the range of admissible vehicle mass so that a mass between 70% and 100% of admissible vehicle mass is preferably considered as the predetermined vehicle mass. As a result the indicated sizing offer additionally improved wear conditions and at the same time ideal or approximately ideal stability-optimization and thereby great vehicle safety during a considerable operating period of the vehicle.

Although the drawing of FIG. 3 indicates brakes of the drum type, the teachings of the illustrated embodiments can also simply be applied to other brake types such as disk brakes, for example.

The person skilled in the art recognizes that the scope of protection of the instant invention is not exhausted with its embodiments and further developments but comprises all embodiments whose characteristics fall within the patent claims. It should be specifically mentioned here that the terms "curve ... for equal adhesion utilization ... " in the claims comprises as well the above-mentioned "ideal" or "approximately ideal curve for stability-optimized operation" as any other approximately ideal curve for stability-optimized operation.

We claim:

1. A process for braking a vehicle having a front axle group including at least one pressure-actuated front axle brake, and a rear axle group including at least one pressure-actuated rear axle brake, comprising producing a deceleration command signal (S) indicative of a desired deceleration for said vehicle, when the deceleration command signal (S) is less than or equal to a predetermined switch-over deceleration command signal ($S_1$), applying a front axle brake pressure ($p_1$) to the front axle brake and a rear axle brake pressure ($p_2$) to the rear axle brake which brake pressures correspond to wear-optimized curves for the front and rear axle groups, and when the deceleration command signal (S) is greater than the switch-over deceleration command signal ($S_1$), a) setting the front axle brake pressure ($p_1$) in accordance with a parabola ($S_1$, $p_{1V}$; $S_2$, $p_{1R}$) which aa) passes through a point ($S_1$, $p_{1V}$) which is defined by the switch-over deceleration command signal ($S_1$) and a wear-optimized front axle brake pressure ($P_{1V}$) assigned to it, ab) passes through a second point ($S_2$, $p_{1R}$) which is defined by a predetermined second deceleration command signal ($S_2$) and a front axle brake pressure ($p_{1R}$) assigned to same, wherein the second deceleration command signal ($S_2$) corresponds to 70% to 100% of a usable value range of the deceleration command signal (S), and wherein the second point ($S_2$, $p_{1R}$) is located on a curve of the front axle brake pressure ($p_1$) for equal adhesion utilization on the front axle group and on the rear axle group, and ac) the slope of the parabola ($S_1$, $p_{1V}$; $S_2$, $p_{1R}$) at the point ($S_1$, $p_{1V}$) defined in aa) is equal to the slope of the curve of the front axle brake pressure ($p_1$) for equal adhesion utilization on the front axle group and on the rear axle group at a point corresponding to the switch-over deceleration command signal ($S_1$), and b) setting the rear axle pressure ($p_2$) in accordance with a second parabola ($S_1$, $p_{2V}$; $S_2$, $p_{2R}$; $S_3$) which ba) passes through a point ($S_1$, $p_{2V}$) defined by the switch-over deceleration command signal ($S_1$) and a wear-optimized rear axle brake pressure ($p_{2V}$) assigned to it, bb) passes through a second point ($S_2$, $p_{2R}$) which is defined by the second deceleration command signal ($S_2$) and by a rear axle brake pressure ($p_{2R}$) assigned to same, wherein the second point ($S_2$, $p_{2R}$) is located on a curve of the rear axle brake pressure ($p_{2R}$) for equal adhesion utilization on the front axle group and on the rear axle group, and bc) has an apex at a predetermined deceleration command signal ($S_3$).

2. Process as in claim 1, wherein said predetermined deceleration command signal ($S_3$) defined in bc) is assigned to the apex of the curve of the rear axle brake pressure for equal adhesion utilization on the front axle group and on the rear axle group.

3. Process as in claim 1, wherein the apex of the second parabola ($S_1$, $p_{2V}$; $S_2$, $p_{2R}$; $S_3$) of said rear axle brake pressure ($p_2$) is located in the region of an apex of the curve of the rear axle brake pressure ($p_2$) for equal adhesion utilization on the front axle group and on the rear axle group.

4. A process for braking a vehicle having a front axle group including at least one pressure-actuated front axle brake, and a rear axle group including at least one pressure-actuated rear axle brake, comprising producing a deceleration command signal (S) indicative of a desired deceleration for said vehicle, when said deceleration command signal (S) is less than or equal to a predetermined switch-over deceleration command signal ($S_1$), applying a front axle brake pressure ($p_1$) to said front axle brake and a rear axle brake pressure ($p_2$) to said rear axle brake which brake pressures correspond to wear-optimized curves for the front and rear axle groups, and when the deceleration command signal (S) is greater than the switch-over deceleration command signal ($S_1$), a) setting the front axle brake pressure ($p_1$) in accordance with a parabola ($S_1$, $p_{1V}$; $S_2$, $p_{1R}$) which aa) passes through a point ($S_1$, $p_{1V}$) which is defined by the switch-over deceleration command signal ($S_1$) and a wear-optimized front axle brake pressure ($p_{1V}$) assigned to it, ab) passes through a second point ($S_2$, $p_{1R}$) which is defined by a predetermined second deceleration command signal ($S_2$) and a front axle brake pressure ($p_{1R}$) assigned to same, wherein the second deceleration command signal ($S_2$) corresponds to 70% to 100% of a usable value range of the deceleration command signal (S), and wherein the second point ($S_2$, $p_{1R}$) is located on a curve of the front axle brake pressure ($p_1$) for equal adhesion utilization on the front axle group and on the rear axle group, and ac) the slope of the parabola ($S_1$, $p_{1V}$; $S_2$, $p_{1R}$) at the point ($S_1$, $p_{1V}$) defined in aa) is equal to the slope of the curve of the front axle brake pressure ($p_1$) for equal adhesion utilization on the front axle group and on the rear axle group at a point corresponding to the switch-over deceleration command signal ($S_1$), and b) setting the rear axle pressure ($p_2$) in accordance with a second parabola ($S_1$, $p_{2V}$; $S_4$, $p_{2R4}$; $S_5$, $p_{2R5}$) which ba) passes through a point ($S_1$, $p_{2V}$) defined by the switch-over deceleration command signal ($S_1$) and a wear-optimized rear axle brake pressure ($p_{2V}$) assigned to it, bb) passes through a second point ($S_4$, $p_{2R4}$) which is defined by a predetermined third deceleration command signal ($S_4$) and by a rear axle brake pressure ($p_{2R4}$) assigned to same, and bc) passes through a third point ($S_5$, $p_{2R5}$) which is defined by a predetermined fourth deceleration command signal ($S_5$) and a rear axle brake pressure ($p_{2R5}$) assigned to it, wherein the fourth deceleration command signal ($S_5$) is greater than the third deceleration command signal ($S_4$), wherein the second point ($S_4$, $p_{2R4}$) and the third point ($S_5$, $p_{2R5}$) are located on a curve of the rear axle brake pressure ($p_2$) for equal adhesion utilization on the front axle group and on the rear axle group, and wherein the third deceleration command signal ($S_4$) and the fourth deceleration command signal ($S_5$) represent vehicle decelerations between 0.4 g and 1.0 g.

5. Process as in claim 4, wherein the third deceleration command signal ($S_4$) represents a vehicle deceleration between 0.45 g and 0.6 g and the fourth deceleration command signal ($S_5$) represents a vehicle deceleration between 0.6 g and 1.0 g.

6. A braking system for a vehicle, comprising a deceleration command signal transmitter which produces a deceleration command signal (S), at least one load sensor, an electrically controlled pressure modulator for controlling the application of front axle brake pressure ($p_1$) to at least one pressure-actuated front axle brake in a front axle group, and electrically controlled pressure modulator for controlling the application of rear axle brake pressure ($p_2$) to at least one pressure-actuated rear axle brake in a rear axle group, and a central unit which is connected at inputs to the deceleration command signal transmitter and to the load sensor and at outputs to the pressure modulators, wherein the central unit includes means for
  a) controlling the pressure modulator assigned to the front axle brake so that
    aa) when the deceleration command signal (S) is less than or equal to a switch-over deceleration command signal ($S_1$), the front axle brake pressure ($p_1$) is set to correspond to a wear-optimized curve, and
    ab) when the deceleration command signal (S) is greater than the switch-over command signal ($S_1$), the front axle brake pressure ($p_1$) is set to correspond to a parabola ($S_1$, $p_{1V}$; $S_2$, $p_{1R}$) which passes through a point ($S_1$, $p_{1V}$) which is defined by the switch-over deceleration command signal ($S_1$) and a wear-optimized front axle brake pressure ($p_{1V}$) assigned to it,
    passes through a second point ($S_2$, $p_{1R}$) which is defined by a predetermined second deceleration command signal ($S_2$) and a front axle brake pressure ($p_{1R}$) assigned to same, wherein the second deceleration command signal ($S_2$) corresponds to 70% to 100% of a usable value range of the deceleration command signal (S), and
    wherein the second point ($S_2$, $p_{1R}$) is located on a curve of the front axle brake pressure ($p_1$) for equal adhesion utilization on the front axle group and on the rear axle group, and
    the slope of the parabola ($S_1$, $p_{1V}$; $S_2$, $p_{1R}$) at the point ($S_1$, $p_{1V}$) is equal to the slope of the curve of the front axle brake pressure ($p_1$) for equal adhesion utilization on the front axle group and on the rear axle group at a point corresponding to the switch-over deceleration command signal ($S_1$), and
  b) controlling the pressure modulator assigned to the rear axle brake so that
    ba) when the deceleration command signal (S) is less than or equal to the switch-over deceleration command signal ($S_1$), the rear axle brake pressure ($p_2$) is set to correspond to a wear-optimized curve, and
    bb) when the deceleration command signal (S) is greater than the switch-over deceleration command signal ($S_1$), the rear axle brake pressure ($p_2$) is set to correspond to a parabola ($S_1$, $p_{2V}$; $S_2$, $p_{2R}$; $S_3$) which passes through a point ($S_1$, $p_{2V}$) defined by the switch-over deceleration command signal ($S_1$) and a wear-optimized rear axle brake pressure ($p_{2V}$) assigned to it,
    passes through a second point ($S_2$, $p_{2R}$) which is defined by the second deceleration command signal ($S_2$) and by a rear axle brake pressure ($p_{2R}$) assigned to same, wherein the second point ($S_2$, $p_{2R}$) is located on a curve of the rear axle brake pressure ($p_{2R}$) for equal adhesion utilization on the front axle group and on the rear axle group, and
    has an apex at a predetermined deceleration command signal ($S_3$).

7. A braking system for a vehicle, comprising a deceleration command signal transmitter which produces a deceleration command signal (S), at least one load sensor, an electrically controlled pressure modulator for controlling the application of front axle brake pressure ($p_1$) to at least one pressure-actuated front axle brake in a front axle group, an electrically controlled pressure modulator for controlling the application of rear axle brake pressure ($p_2$) to at least one pressure-actuated rear axle brake in a rear axle group, and a central unit which is connected at inputs to the deceleration command signal transmitter and to the load sensor and at outputs to the pressure modulators, wherein the central unit includes means for
  a) controlling the pressure modulator assigned to the front axle brake so that
    aa) when the deceleration command signal (S) is less than or equal to a switch-over deceleration command signal ($S_1$), the front axle brake pressure ($p_1$) is set to correspond to a wear-optimized curve, and
    ab) when the deceleration command signal (S) is greater than the switch-over command signal ($S_1$), the front axle brake pressure ($p_1$) is set to correspond to a parabola ($S_1$, $p_{1V}$; $S_2$, $p_{1R}$) which passes through a point ($S_1$, $p_{1V}$) which is defined by the switch-over deceleration command signal ($S_1$) and a wear-optimized front axle brake pressure ($p_1$) assigned to it,
    passes through a second point ($S_2$, $p_{1R}$) which is defined by a predetermined second deceleration command signal ($S_2$) and a front axle brake pressure ($p_{1R}$) assigned to same, wherein the second deceleration command signal ($S_2$) corresponds to 70% to 100% of a usable value range of the deceleration command signal (S), and wherein the second point ($S_2$, $p_{1R}$) is located on a curve of the front axle brake pressure ($p_1$) for equal adhesion utilization on the front axle group and on the rear axle group, and the slope of the parabola $(S_1, p_{1V}; S_2, p_{1R})$ at the point $(S_1, p_{1V})$ is equal to the slope of the curve of the front axle brake pressure $(p_1)$ for equal adhesion utilization on the front axle group and on the rear axle group at a point corresponding to the switch-over deceleration command signal $(S_1)$, and b) controlling the pressure modulator assigned to the rear axle brake so that ba) when the deceleration command signal $(S)$ is less than or equal to the switch-over deceleration command signal $(S_1)$, the rear axle brake pressure $(p_2)$ is set to correspond to a wear-optimized curve, and bb) when the deceleration command signal $(S)$ is greater than the switch-over deceleration command signal $(S_1)$, the rear axle brake pressure $(p_2)$ is set to correspond to a parabola $(S_1, p_2; S_4, p_{2R4}; S_5, p_{2R5})$ which passes through a point $(S_1, p_{2V})$ defined by the switch-over deceleration command signal $(S_1)$ and a wear-optimized rear axle brake pressure $(p_{2V})$ assigned to it, passes through a second point $(S_4, p_{2R4})$ which is defined by a predetermined third deceleration command signal $(S_4)$ and by a rear axle brake pressure $(p_{2R4})$ assigned to same, and passes through a third point $(S_5, p_{2R5})$ which is defined by a predetermined fourth deceleration command signal $(S_5)$ and a rear axle brake pressure $(p_{2R5})$ assigned to it, wherein the fourth deceleration command signal $(S_5)$ is greater than the third deceleration command signal $(S_4)$, wherein the second point $(S_4, p_{2R4})$ and the third point $(S_5, p_{2R5})$ are located on a curve of the rear axle brake pressure $(p_2)$ for equal adhesion utilization on the front axle group and on the rear axle group, and wherein the third deceleration command signal $(S_4)$ and the fourth deceleration command signal $(S_5)$ represent vehicle deceleration between 0.4 g and 1.0 g.

8. The braking system of claim 6 or 7, wherein said front axle brake includes at least one front axle brake lining and said rear axle brake includes at least one rear axle brake lining, wherein the surface of the front axle brake lining is sized in relation to the surface of the rear axle brake lining as a static front axis group load $(G_1)$ is to a static rear axle group load $(G_2)$ when the vehicle mass $(G)$ is of a predetermined value between 70% and 100% of a maximum vehicle mass.

9. The braking system of claim 6 or 7 wherein the front axle group comprises a single front axle.

10. The braking system of claim 6 or 7 wherein the rear axle group comprises a single rear axle.

11. A braking system for a vehicle, comprising a deceleration command signal transmitter which produces a deceleration command signal $(S)$, at least one load sensor, an electrically controlled pressure modulator for controlling the application of front axle brake pressure $(p_1)$ to at least one pressure-actuated front axle brake in a front axle group, an electrically controlled pressure modulator for controlling the application of rear axle brake pressure $(p_2)$ to at least one pressure-actuated rear axle brake in a rear axle group, and a central unit which is connected at outputs to the pressure modulators, wherein the central unit includes means for a) controlling the pressure modulator assigned to the front axle brake so that aa) when the deceleration command signal $(S)$ is less than or equal to a switch-over deceleration command signal $(S_1)$, the front axle brake pressure $(p_1)$ is set to correspond to a wear-optimized curve, and ab) when the deceleration command signal $(S)$ is greater than the switch-over command signal $(S_1)$, the front axle brake pressure $(p_1)$ is set to correspond to a parabola $(S_1, p_{1V}; S_2, p_{1R})$ which passes through a point $(S_1, p_{1V})$ which is defined by the switch-over deceleration command signal $(S_1)$ and a wear-optimized front axle brake pressure $(p_{1V})$ assigned to it, passes through a second point $(S_2, p_{1R})$ which is defined by a predetermined second deceleration command signal $(S_2)$ and a front axle brake pressure $(p_{1R})$ assigned to same, wherein the second deceleration command signal $(S_2)$ corresponds to 70% to 100% of a usable value range of the deceleration command signal $(S)$, and wherein the second point $(S_2, p_{1R})$ is located on a curve of the front axle brake pressure $(p_1)$ for equal adhesion utilization on the front axle group and on the rear axle group, and the slop of the parabola $(S_1, p_{1V}; S_2, p_{1R})$ is equal to the slope of the curve of the front axle brake pressure $(p_1)$ for equal adhesion utilization on the front axle group and on the rear axle group at a point corresponding to the switch-over deceleration command signal $(S_1)$, and b) controlling the pressure modulator assigned to the rear axle brake so that ba) when the deceleration command signal $(S)$ is less than or equal to the switch-over deceleration command signal $(S_1)$, the rear axle brake pressure $(p_2)$ is set to correspond to a wear-optimized curve, and bb) when the deceleration command signal $(S)$ is greater than the switch-over deceleration command signal $(S_1)$, the rear axle brake pressure $(p_2)$ is set to correspond to a parabola which passes through a point on the wear-optimized curve which corresponds to the switch-over deceleration signal and at least one point on the curve for equal adhesion utilization which point corresponds to another deceleration command signal.

12. The braking system of claim 11, wherein the parabola for the rear axle brake when the deceleration command signal is greater than the switch-over command signal $(S_1)$ a) passes through a point $(S_1, p_{2V})$ defined by the switch-over deceleration command signal $(S_1)$ and a wear-optimized rear axle brake pressure $(p_{2V})$ assigned to it, b) passes through a second point $(S_4, p_{2R4})$ which is defined by a predetermined third deceleration command signal $(S_4)$ and by a rear axle brake pressure $(p_{2R4})$ assigned to same, and c) passes through a third point $(S_5, p_{2R5})$ which is defined by a predetermined fourth deceleration command signal $(S_5)$ and a rear axle brake pressure $(p_{2R5})$ assigned to it, wherein the fourth deceleration command signal $(S_5)$ is greater than the third deceleration command signal ($S_4$), wherein the second point ($S_4$, $p_{2R4}$) and the third point ($S_5$, $p_{2R5}$) are located on a curve of the rear axle brake pressure ($p_2$) for equal adhesion utilization on the front axle group and an on the rear axle group, and wherein the third deceleration command signal ($S_4$) and the fourth deceleration command signal ($S_5$) represent vehicle decelerations between 0.4 g and 1.0 g.

13. The braking system of claim 11, wherein the parabola for the rear axle brake when the deceleration command signal is greater than the switch-over command signal ($S_1$)

a) passes through a second point ($S_2$, $p_{2V}$) which is defined by the second deceleration command signal ($S_2$) and by a rear axle brake pressure ($p_{2R}$) is located on a curve of the rear axle brake pressure ($p_{2R}$) for equal adhesion utilization on the front axle group and on the rear axle group, and b) has an apex at a predetermined deceleration command signal ($S_3$).

14. The braking system of claim 13, wherein said front axle brake includes at least one front axle brake lining and said rear axle brake includes at least one rear axle brake lining, wherein the surface of the front axle brake lining is sized in relation to the surface of the rear axle brake lining as a static front axle group load ($G_1$) is to a static rear axle group load ($G_2$) when the vehicle mass (G) is of a predetermined value between 70% and 100% of a maximum mass.

15. The braking system of claim 13 wherein the front axle group comprises a single front axle.

16. The braking system of claim 13 wherein the rear axle group comprises a single rear axle.

* * * * *